US008766603B2

(12) United States Patent
Hashimoto

(10) Patent No.: US 8,766,603 B2
(45) Date of Patent: Jul. 1, 2014

(54) CONTROL APPARATUS FOR INVERTER GENERATOR

(75) Inventor: Shoji Hashimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 238 days.

(21) Appl. No.: 13/472,572

(22) Filed: May 16, 2012

(65) Prior Publication Data

US 2012/0293140 A1 Nov. 22, 2012

(30) Foreign Application Priority Data

May 17, 2011 (JP) ................................ 2011-110576

(51) Int. Cl.
*H02P 9/00* (2006.01)
(52) U.S. Cl.
USPC .............................................. 322/89; 363/65
(58) Field of Classification Search
USPC .............................. 322/37, 89, 94; 363/65, 37
See application file for complete search history.

(56) References Cited

U.S. PATENT DOCUMENTS

| 5,852,554 | A | * | 12/1998 | Yamamoto | ...................... 363/71 |
| 6,118,186 | A | * | 9/2000 | Scott et al. | ................... 290/40 B |
| 6,621,719 | B2 | * | 9/2003 | Steimer et al. | ................... 363/43 |
| 7,068,524 | B2 | * | 6/2006 | Nakagawa et al. | ............. 363/67 |
| 8,638,003 | B2 | * | 1/2014 | Hashimoto et al. | ............. 290/27 |
| 2012/0291739 | A1 | * | 11/2012 | Hashimoto et al. | ........ 123/179.3 |
| 2012/0293004 | A1 | * | 11/2012 | Hashimoto et al. | ............. 307/82 |
| 2012/0294049 | A1 | * | 11/2012 | Hashimoto et al. | ............. 363/37 |

FOREIGN PATENT DOCUMENTS

JP 11-308896 11/1999

* cited by examiner

*Primary Examiner* — Nicholas Ponomarenko
(74) *Attorney, Agent, or Firm* — Rankin, Hill & Clark LLP

(57) ABSTRACT

In a control apparatus for an inverter generator having a first, second and third windings wound around an alternator driven by an engine, and first, second and third inverters adapted to convert alternating current outputted from the first, second and third windings into direct current and invert the converted direct current into single-phase alternating current in a desired frequency so as to supply to the electric load, there is provided with an actuator (stepper motor) to open and close a throttle valve of the engine, and it is configured to detect output powers (effective powers) of the first, second and third inverters, to determine a target engine speed based on the detected output powers, and to control an operation of the actuator so that the engine speed converges at the determined target engine speed.

14 Claims, 13 Drawing Sheets

REFERENCE SIGNAL

SYNCHRONOUS SIGNAL 1

SYNCHRONOUS SIGNAL 2

GENERATING SQUARE WAVE SHIFTED BY 120 AND 240 DEGREE

WHEN LOWERING FREQUENCY OF REFERENCE WAVE

REFERENCE SIGNAL

SYNCHRONOUS SIGNAL 1

SYNCHRONOUS SIGNAL 2

ALWAYS GENERATING SYNCHRONIZED SIGNAL CORRESPONDING TO INCREASING AND DECREASING FREQUENCY OF REFERENCE SIGNAL

FIG.13

| REQUIRED POWER [W]<br>(TARGET EFFECTIVE<br>POWER Pac_trg) | 200 | 400 | 600 | 800 | 1000 | 1200 | 1400 | 1600 | 1800 | 2000 |
|---|---|---|---|---|---|---|---|---|---|---|
| CANDIDATE VALUE FOR<br>TARGET ENGINE SPEED<br>[rpm] | 2400 | 2550 | 2700 | 2850 | 3000 | 3200 | 3400 | 3500 | 3600 | 3800 |

CONTROL APPARATUS FOR INVERTER GENERATOR

BACKGROUND OF THE INVENTION

1. Technical Field

Embodiments of the invention relate to a control apparatus for an inverter generator, particularly to a control apparatus for an inverter generator equipped with an alternator driven by an engine.

2. Background Art

Conventionally, there is a well-known technique for an inverter generator which temporarily converts alternating current outputted from an alternator driven by an engine into direct current at a converter composed of a thyristor bridge circuit and inverts the direct current into alternating current in a predetermined frequency at an inverter so as to supply the inverted alternating current to an electric load, as taught, for example, by Japanese Laid-Open Patent Application No. Hei 11(1999)-308896. In the reference, it detects a turn-on angle of the thyristor and determines a target (desired) engine speed and controls the engine to the speed so that the detected turn-on angle converges at a desired turn-on angle.

SUMMARY

In the technique of the reference, when the engine speed goes up and down in response to an increase and decrease of the electric load, the input power (i.e., output power from the converter) fluctuates. Hence the turn-on angle of the thyristor should be changed. In other words, since the parameter to be used to determine the target engine speed fluctuates, the engine speed becomes unstable, resulting control hunting disadvantageously.

An object of an embodiment of this invention is therefore to overcome the foregoing problem by providing a control apparatus for an inverter generator equipped with an alternator driven by an engine that can control the engine speed reliably even when the electric load is increased and decreased.

In order to achieve the object, the embodiments provide in its first aspect a control apparatus for an inverter generator having a first, second and third windings wound around an alternator driven by an engine, and first, second and third inverters each connected to the first, second and third windings respectively and adapted to convert alternating current outputted from the first, second and third windings into direct current by driving switching elements for direct current conversion and to invert the converted direct current into single-phase alternating current in a desired frequency by driving the switching elements for alternating current conversion so as to supply the inverted alternating current to an electric load, comprising an actuator adapted to open and close a throttle valve of the engine, a power detector adapted to detect output powers of the first, second and third inverters, and an actuator controller adapted to determine a target engine speed of the engine based on the detected output powers of the first, second and third inverters and to control an operation of the actuator such that the speed of the engine converges at the determined target engine speed.

In order to achieve the object, the embodiments provide in its second aspect a method for controlling an apparatus for an inverter generator having a first, second and third windings wound around an alternator driven by an engine, first, second and third inverters each connected to the first, second and third windings respectively and adapted to convert alternating current outputted from the first, second and third windings into direct current by driving switching elements for direct current conversion and to invert the converted direct current into single-phase alternating current in a desired frequency by driving the switching elements for alternating current conversion so as to supply the inverted alternating current to an electric load, and an actuator adapted to open and close a throttle valve of the engine, the improvement comprises the steps of detecting output powers of the first, second and third inverters; determining a target engine speed of the engine based on the detected output powers of the first, second and third inverters; and controlling an operation of the actuator such that the speed of the engine converges at the determined target engine speed.

BRIEF DESCRIPTION OF DRAWINGS

The above and other objects and advantages will be more apparent from the following description and drawings in which:

FIG. 13 is an explanatory view showing a map used for processing of FIG. 12 flowchart etc.;

DESCRIPTION OF EMBODIMENTS

A control apparatus for an inverter generator according to an embodiment of the present invention will now be explained with reference to the attached drawings.

Figure 1:
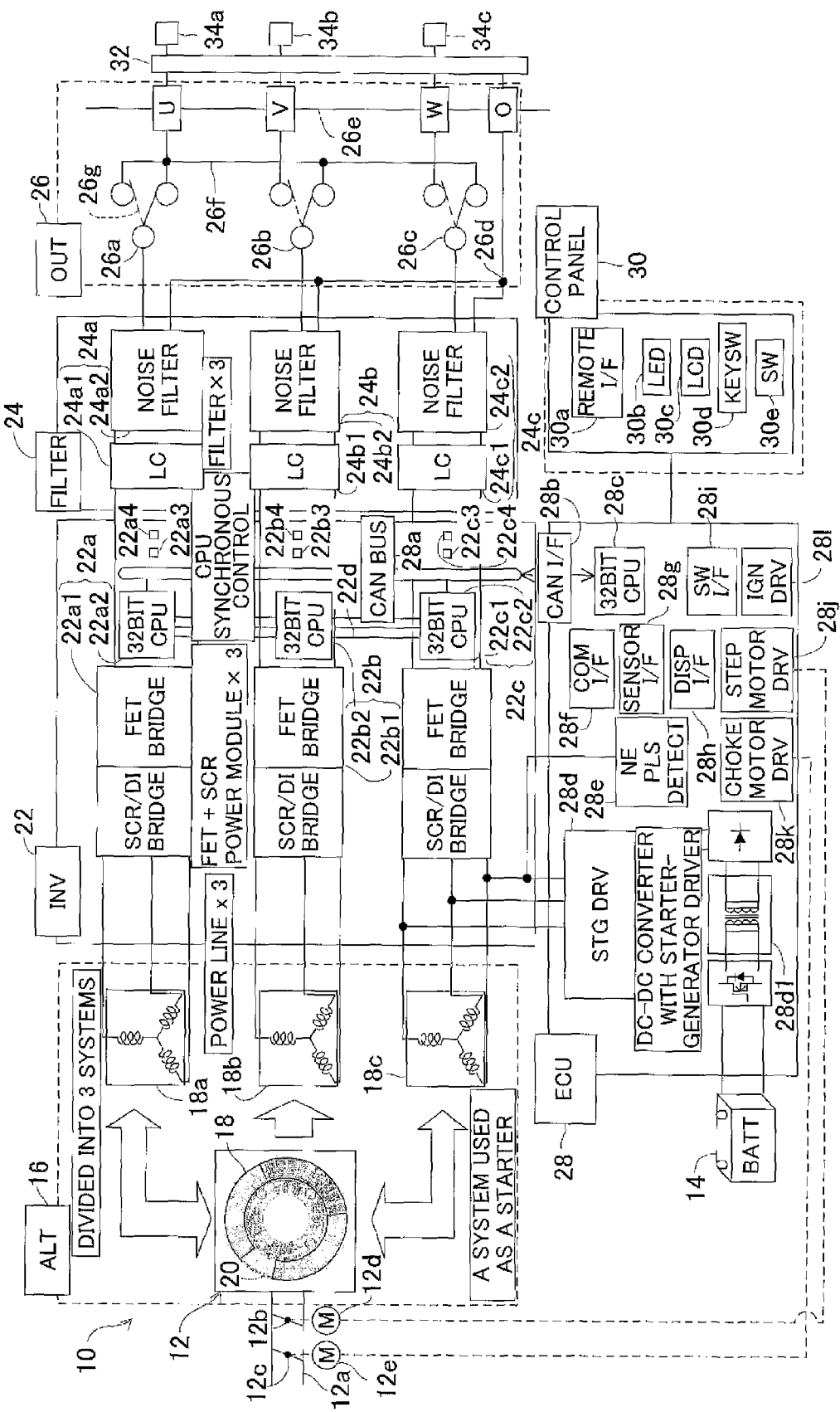
FIG. 1 is an overall block diagram showing a control apparatus for an inverter generator according to a first embodiment of the invention.

FIG. 1 is an overall block diagram showing a control apparatus for an engine generator (inverter generator) according to an embodiment of the invention.

In FIG. 1, symbol 10 designates an inverter generator. The generator 10 is equipped with an engine (internal combustion engine) 12 and has a rated output of about 5 kW (AC (alternating current) 100V, 50 A). The engine 12 is an air-cooled, spark-ignition gasoline engine.

A throttle valve 12b and choke valve 12c are installed in an air intake pipe 12a of the engine 12. The throttle valve 12b is connected to a throttle motor 12d (stepper motor, actuator), and the choke valve 12c is connected to a choke motor (also composed of a stepper motor (actuator)) 12e.

The engine 12 is equipped with a battery 14 whose rated output is about 12V. When power is supplied from the battery 14, the throttle motor 12d and choke motor 12e respectively drive the throttle valve 12b and choke valve 12c to open and close. The engine 12 has an alternator section (shown as "ALT") 16.

Figure 2:
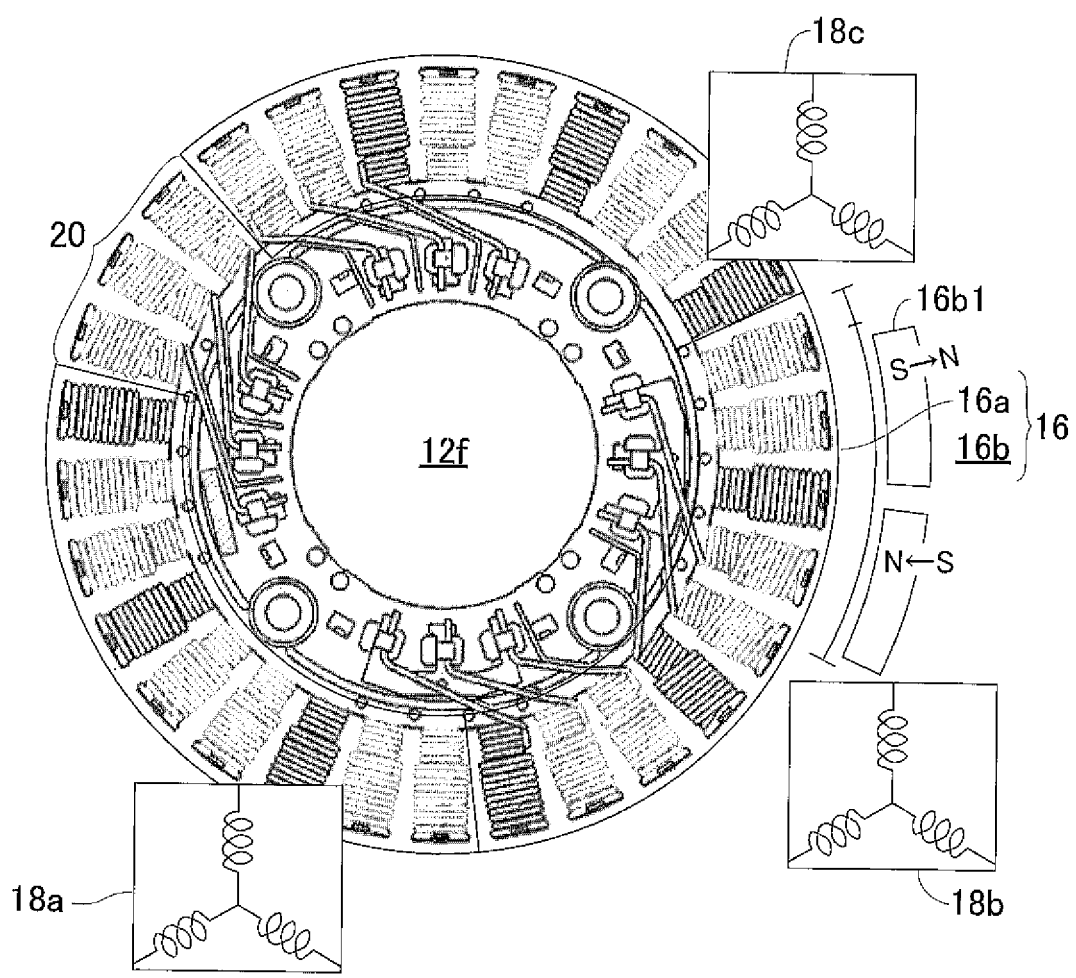
FIG. 2 is a plan view showing a crank case of an engine of the inverter generator shown in FIG. 1.

FIG. 2 is a plan view of a crank case 12f of the engine 12 shown in FIG. 1, where the alternator section 16 is provided.

As shown in FIG. 2, the alternator section 16 includes a stator 16a mounted on the crank case 12f of the engine 12, and a rotor 16b which is rotatably installed around the stator 16a and also functions as a flywheel of the engine 12.

The stator 16a comprises thirty teeth. Twenty-seven teeth of them are wound by three-phase output windings (main windings) 18 comprising of three sets of U, V and W-phase windings, and the other three teeth of them are also wound by one three-phase output winding (sub winding) 20 comprising one set of the U, V, and W-phase windings. The main windings 18 comprise windings 18a, 18b and 18c.

Multiple pairs of permanent magnet pieces 16b1 are embedded or attached inside the rotor 16b installed on the outer side of the stator 16a with radially oriented polarity reversed alternately to face the output windings 18, 20. In the alternator section 16, when the permanent magnet pieces 16b1 of the rotor 16b are rotated around the stator 16a, AC power of the U, V, and W-phase is outputted (generated) from the three-phase output windings 18 (more specifically, 18a, 18b, 18c) and the AC power of each phase is also outputted from the sub winding 20.

The explanation of FIG. 1 will be resumed. The generator 10 according to this embodiment has, in addition to the alternator section (ALT) 16 where the output windings 18 are wound, an inverter section (shown as "INV") 22, a filter section (shown as "FILTER") 24, an output section (shown as "OUT") 26, an engine control section (shown as "ECU") 28, and an engine control panel section (shown as "CONTROL PANEL") 30. The ECU (Electronic Control Unit) functions as an electronic control section and has a CPU as explained later.

As illustrated, the characteristic feature of the generator 10 according to this embodiment is that three sets (three) of single-phase inverter generators (inverters) are connected in parallel so that they can output a three-phase AC of a desired voltage in a desired phase or a single-phase AC of a desired voltage selectively and reliably.

Specifically, the generator 10 has three sets of windings 18 composed of first, second and third windings 18a, 18b, 18c, the inverter section 22 comprising three sets of the inverters composed of first, second and third inverters (inverter generators) 22a, 22b, 22c, the filter section 24 comprising three sets of filters composed of first, second and third filters 24a, 24b, 24c, the output section 26 comprising a three-phase output terminal 26e and a single-phase output terminal 26f, the engine control section 28 that controls an operation of the engine 12, and the control panel section 30.

The inverter section 22 and other sections are provided with, for example, semiconductor chips installed on a printed circuit board accommodated in a case located at an appropriate position of the engine 12. The control panel section 30 is also provided with semiconductor chips similarly installed at an appropriate position of the engine 12 and a panel connected thereto.

The output windings 18, the inverter section 22, the filter section 24 and the output section 26 (each comprising three sets labeled with letters a, b or c) are configured to be connected with the part of the same letter to each other correspondently.

The first, second and third inverters 22a, 22b, 22c constituting the inverter section 22 comprise single-phase two-wire inverters that have power modules 22a1, 22b1, 22c1 composed of FETs (Field Effect Transistors) and SCRs (thyristors) integrally connected thereto, 32-bit CPUs 22a2 (first controller), 22b2 (second controller), 22c2 (third controller), current sensors 22a3, 22b3, 22c3 and voltage sensors 22a4, 22b4, 22c4 for detecting voltage and current outputted from the first, second and third inverters 22a, 22b, 22c. The CPUs 22a2, 22b2, 22c2 are connected via a communication path 22d with each other to be able to communicate therewith.

Figure 3:
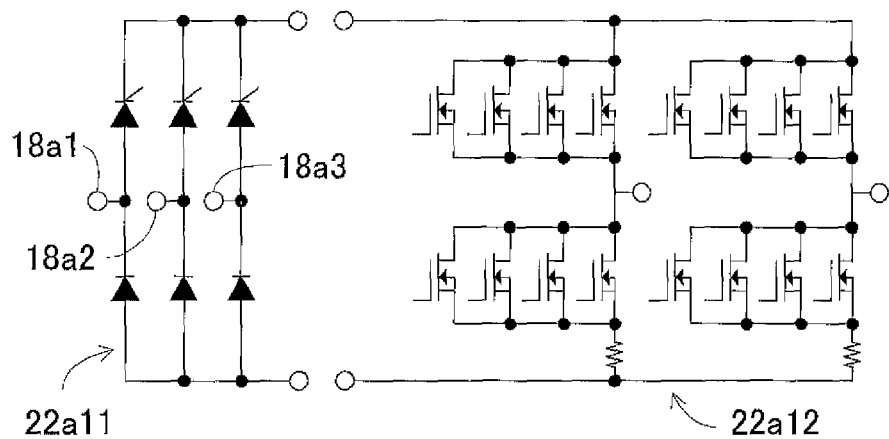
FIG. 3 is a circuit diagram showing a detailed configuration of an inverter section of the inverter generator shown in FIG. 1.

FIG. 3 is a circuit diagram showing a configuration of the inverter section 22 in detail. Although the following explanation will be made for the set a, the explanation can also be applied to the sets b and c, since their configurations are basically the same with each other.

As illustrated in FIG. 3, the power module 22a1 comprises a hybrid bridge circuit 22a11 in which three SCRs (thyristors used as switching elements for direct current (DC) conversion) and three DIs (diodes) are bridge-connected, and an H bridge circuit 22a12 in which four FETs (Field Effect Transistors used as switching elements for AC conversion) are bridge-connected.

Three-phase AC power outputted (generated) from the U-phase winding 18a of the output windings 18 wound around the alternator section 16 is inputted to the first inverter 22a associated therewith and then inputted to a mid-point between the SCR and DI in the hybrid bridge circuit 22a11 of the power module 22a1.

A gate of the SCR in the hybrid bridge circuit 22a11 is connected to the battery 14 via a driver circuit (not shown). The CPU 22a2 controls current supply (ON; conducted) or termination of the current supply (OFF; not conducted) to the gate of the SCR from the battery 14 through the driver circuit.

Specifically, the CPU 22a2 turns ON (conducts) the gate of the SCR at a turn-on angle (angle of conduction) corresponding to a desired output voltage, such that the AC inputted to the power module 22a1 from the output winding 18a is converted into DC at the desired output voltage.

The DC outputted from the hybrid bridge circuit 22a11 is inputted to the FETs-H bridged circuit 22a12 where the FETs are connected to the battery 14. The CPU 22a2 controls current supply (ON; conducted) to the FETs or termination of current supply (OFF; not conducted), the inputted DC is inverted into AC in a desired frequency (e.g., a commercial frequency of 50 Hz or 60 Hz).

Figure 4:
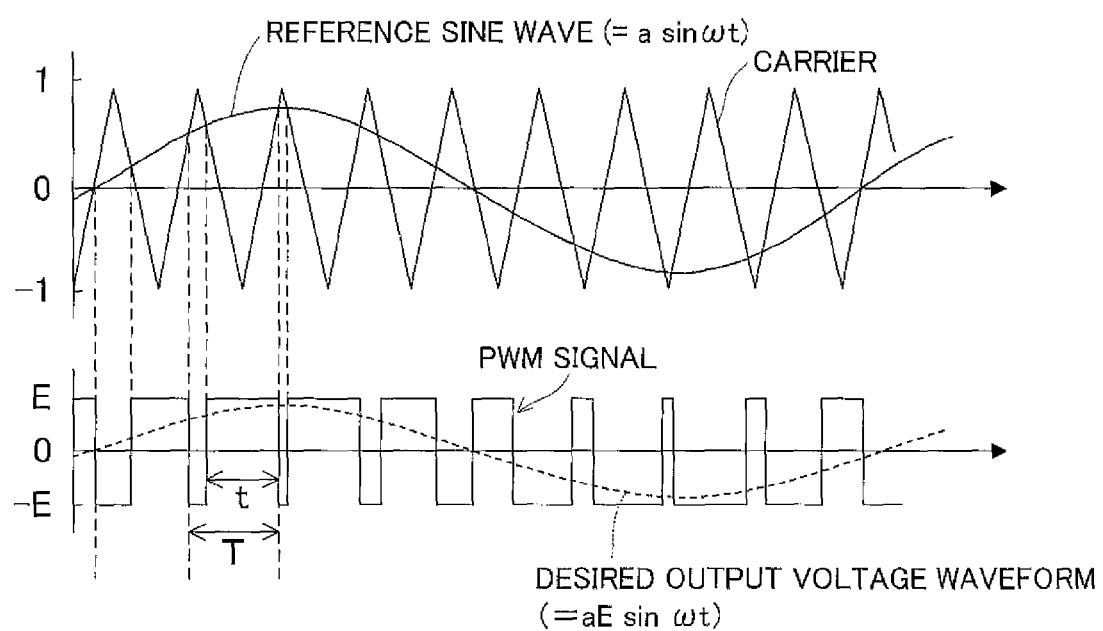
FIG. 4 is an explanatory view explaining an operation of the inverter section of the inverter generator shown in FIG. 1.

FIG. 4 is an explanatory view explaining an operation of the H bridge circuit 22a12.

As illustrated, the CPU 22a2 generates a reference sine wave (signal wave; shown by an upper solid-line wave) in a predetermined frequency (i.e., 50 Hz or 60 Hz commercial frequency) of the desired output voltage (in waveform), and compares the generated reference sine wave with a carrier (e.g., a 20 kHz carrier wave) using a comparator (not shown) so as to produce a PWM (Pulse Width Modulation) signal, and turns ON/OFF the FETs in the H bridge circuit 22*a*12 in accordance with the produced PWM signal.

The lower broken-line wave shown in the FIG. 4 indicates the desired output voltage (in waveform). It should be noted that the period T (step) of the PWM signal (PWM waveform) is actually much shorter than shown, but is enlarged in FIG. 4 for ease of understanding.

Again returning to the explanation of FIG. 1, the inverter section 22 is connected to the filter section 24.

The filter section 24 comprises LC filters (low pass filters) 24*a*1, 24*b*1, 24*c*1 that remove a higher harmonic wave and noise filters 24*a*2, 24*b*2, 24*c*2 that remove a noise. The AC output inverted in the inverter section 24 is inputted to the LC filters 24*a*1, 24*b*1, 24*c*1 and noise filters 24*a*2, 24*b*2, 24*c*2 to remove a higher harmonic wave and noise.

Figure 5:
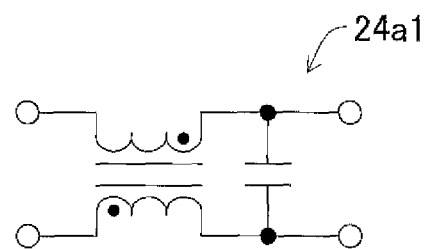
FIG. 5 is a circuit diagram showing a detailed configuration of a filter section of the inverter generator shown in FIG. 1.
Figure 6:
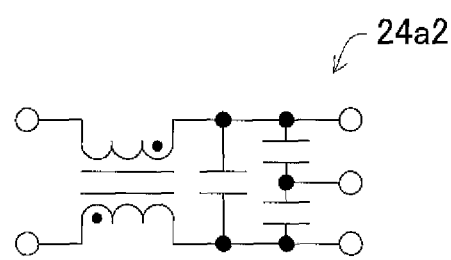
FIG. 6 is a circuit diagram similar to FIG. 5, but showing another detailed configuration of the filter section of the inverter generator shown in FIG. 1.

FIG. 5 shows a circuit configuration of the LC filter 24*a*1, and FIG. 6 shows a circuit configuration of the noise filter 24*a*2. Although not shown, circuit configurations of the LC filters 24*b*1, 24*c*1 and noise filters 24*b*2, 24*c*2 are the same.

In FIG. 1, the inverter section 22 is connected to the output section 26 via the filter section 24.

As shown in the figure, the output section 26 comprises a three-phase (four-wire) output terminal (output terminal) 26*e* and a single-phase (two-wire) output terminal 26*f*. The three-phase output terminal 26*e* is connected to terminal groups 26*a*, 26*b*, 26*c* which are connected to the first, second and third inverters 22*a*, 22*b*, 22*c* respectively and output one AC in a phase from among U, V, W-phases respectively, and is connected to a neutral terminal 26*d* of the terminal groups in series. The single-phase output terminal (output terminal) 26*f* is connected to the terminal groups in parallel and to the neutral terminal in series.

To be more specific, the three-phase (four-wire) output terminal 26*e* is series-connected to a U-phase terminal 26*a* which is connected to the first inverter 22*a* and outputs a U-phase AC, to a V-phase terminal 26*b* which is connected to the second inverter 22*b* and outputs a V-phase AC, to a W-phase terminal 26*c* which is connected to the third inverter 22*c* and outputs a W-phase AC, and to the neutral O-phase terminal 26*d* respectively.

Further, the output section 26 has the single-phase (two-wire) output terminal 26*f* which is parallel-connected to the U-phase terminal 26*a*, to the V-phase terminal 26*b* and to the W-phase terminal 26*c*, and is series-connected to the O-phase terminal 26*d*, and has a switching mechanism 26*g* that switches the three-phase output terminal 26*e* and the single-phase output terminal 26*f*.

The three-phase output terminal 26*e* and single-phase output terminal 26*f* are connected to an electric load 34 via a connector 32. As shown, the connector 32 is connected to a plurality of, in specific, three electric loads 34. The electric load 34*a* is connected to the U-phase terminal 26*a* and 0-phase terminal 26*d*, the electric load 34*b* to the V-phase terminal 26*b* and O-phase terminal 26*d*, the electric load 34*c* to the W-phase terminal 26*c* and O-phase terminal 26*d* so that single-phase AC is supplied to the electric loads 34*a*, 34*b*, 34*c*.

The engine control section 28 has a 32-bit CPU 28*c* and controls operation of the engine 12. The engine control section 28 is connected to the CPUs 22*a*2, 22*b*2, 22*c*2 (first, second and third controllers) of the inverters 22*a*, 22*b*, 22*c* via a CAN (Control Area Network) BUS 28*a* and a CAN I/F (Interface) 28*b* so that it can communicate with the CPUs 22*a*2, 22*b*2, 22*c*2. The output from the aforementioned output winding (sub winding) 20 is supplied to the CPU 22*a*2, 22*b*2, 22*c*2, 28*c* as their operating power.

The engine control section 28 has a starter-generator driver (STG DRV) 28*d* which operates the output winding 18*c*, in addition to the generator, as a starting device (starter) of the engine 12. Specifically, in this embodiment, one of the output windings 18*a*, 18*b*, 18*c* (e.g., output winding 18*c*) is configured to operate as an engine starter with the aid of the starter-generator driver 28*d*, in other words the alternator section 16 is configured to operate as a prime mover.

The starter-generator driver 28*d* comprises a DC-DC converter 28*d*1. As described later, the DC-DC converter 28*d*1 boosts the output (raises its voltage) of the battery 14 to about 200V and supplies the boosted battery output to the output winding 18*c* in response to a command from the CPU 28*c* so that the rotor 16*b* of the alternator section 16 is rotated relative to the stator 16*a* to start the engine 12.

The engine control section 28 further includes a communication (COM) I/F 28*f*, a sensor (SENSOR) I/F 28*g*, a display (DISP) I/F 28*h*, a switching (SW) I/F 28*i*, a drive circuit 28*j* that drives the throttle motor 12*d*, a drive circuit 28*k* that drives the choke motor 12*e*, and an ignition drive circuit 28*l* that drives an ignition device (not shown).

The aforementioned 32-bit CPU 28*c* determines an opening of the throttle valve 12*b* in such a manner that the engine speed converges to a target (desired) engine speed calculated in accordance with required AC output to be supplied to the electric load 32, and supplies current (power) to the throttle motor 12*d* through the drive circuit 28*j* to control its operation. This determination for the target engine speed and control for the operation of the stepper motor 12*d* will be explained later.

The control panel section 30 has a remote (REMOTE) I/F 30*a* which is connected wirelessly (or in wired) to a remote control box (not shown) provided separately from the engine 12 and adapted to be carried by a user, an LED (Light Emitting Diode) 30*b*, an LCD (Liquid Crystal Display) 30*c*, a KEY switch (main switch) 30*d* which is adapted to be manipulated by the user and to send a command to operate (start) and stop the generator 10, and a three-phase/single-phase selector switch 30*e* which is adapted to send a command to switch the output from the generator 10 between the three-phase AC and single-phase AC.

The control panel section 30 and the engine control section 28 are connected wirelessly (or in wired) to communicate with each other. The outputs of the KEY switch 30*d* and selector switch 30*e* of the control panel section 30 are inputted to the engine control section 28 through the switching I/F 28*i*, and the engine control section 28 controls to flush the LED 30*b* and LCD 30*c* of the control panel section 30 through the display I/F 28*h*.

Figure 7:
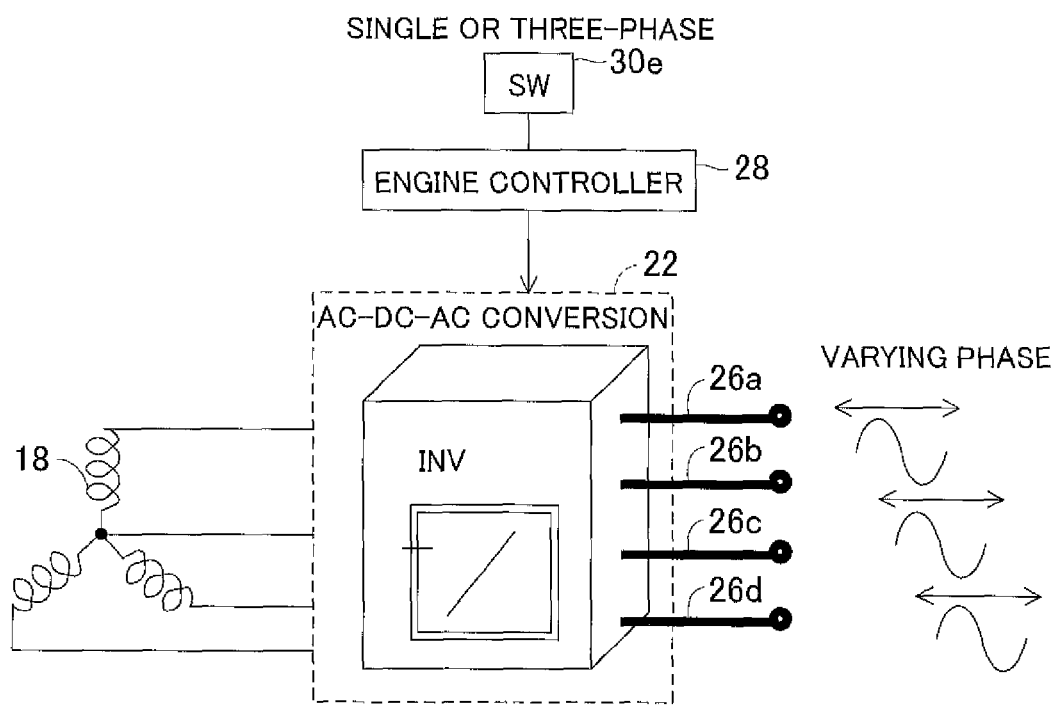
FIG. 7 is an explanatory view explaining an operation of an engine control section of the inverter generator shown in FIG. 1.

FIG. 7 is an explanatory view showing an operation of the engine control section 28.

As described above, since the generator 10 of this embodiment is intended to selectively and reliably output the three-phase AC and single-phase AC at a desired voltage in a desired phase, the inverter section 22 is configured to have three sets of the single-phase inverters (first, second and third inverters) 22*a*, 22*b*, 22*c*, and the CPU 28*c* of the engine control section 28 is configured to operate the switching mechanism 26*g* of the output section 26 to switch the three-phase output terminal and the single-phase output terminal in response to the output of the selector switch 30*e*.

In the inverter section 22, one of the single-phase inverters 22*a*, 22*b*, 22*c*, e.g., the inverter 22*a*, is designated as a master inverter and the others as slave inverters. When the three-phase AC is to be outputted from the generator 10 along with the communication with the CPU 28c of the engine control section 28, as shown in FIG. 8, the CPUs 22a2, 22b2, 22c2 of the three sets of the single-phase inverters 22a, 22b, 22c control the operation of the inverter section 22, making the output phase from the U-phase output terminal 26a of the master inverter 22a as a reference, such that the output phases from the V-phase output terminal 26b and W-phase output terminal 26c of the slave inverters 22b, 22c are offset or delayed from that from the U-phase output terminal 26a by 120 degrees.

On the other hand, when the single-phase AC is outputted along with the communication with the CPU 28c, the CPUs 22a2, 22b2, 22c2 control the operation of the inverter section 22 to synchronize the outputs from the V-phase output terminal 26b and W-phase output terminal 26c of the slave inverters 22b, 22c in phase, making the output from the U-phase terminal 26a of the master inverter 22a as the reference, such that the single-phase AC is outputted from the single-phase output terminal 26f.

Figure 8:
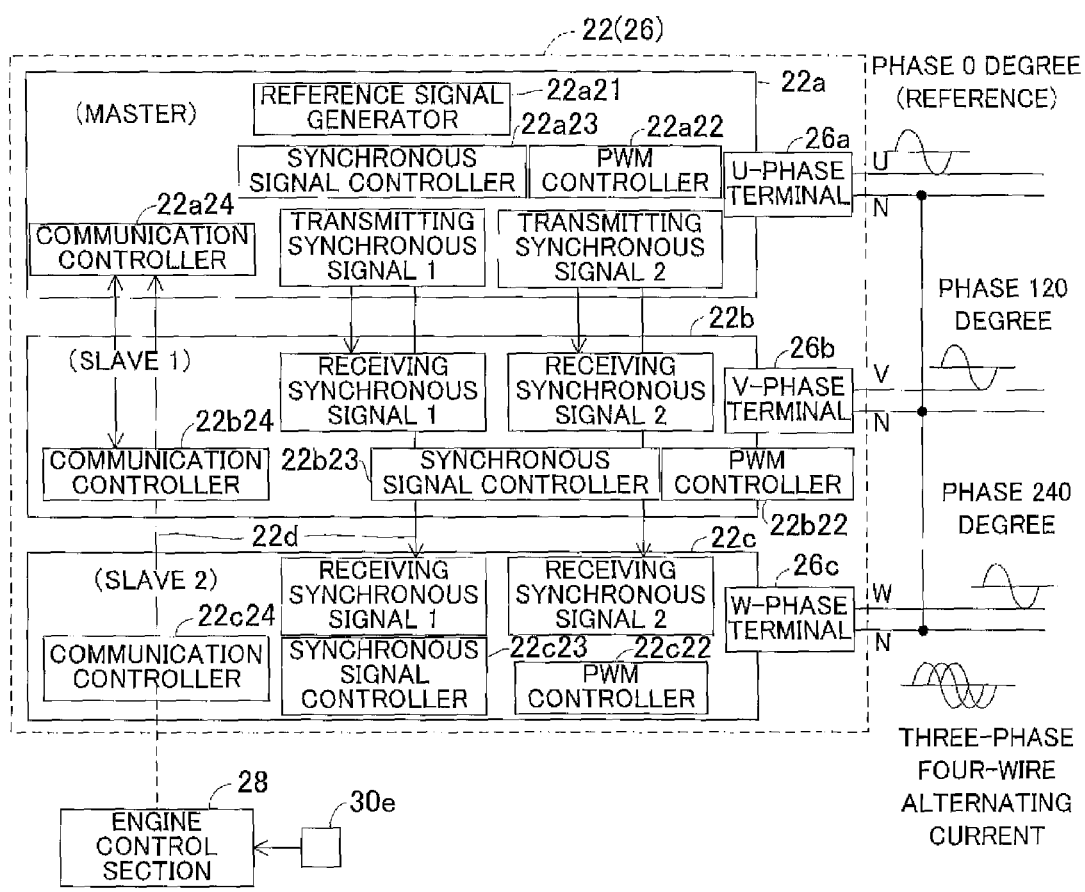
FIG. 8 is a block diagram specifically showing an operation of a controller of the inverter section of the inverter generator shown in FIG. 1.
Figure 9A:
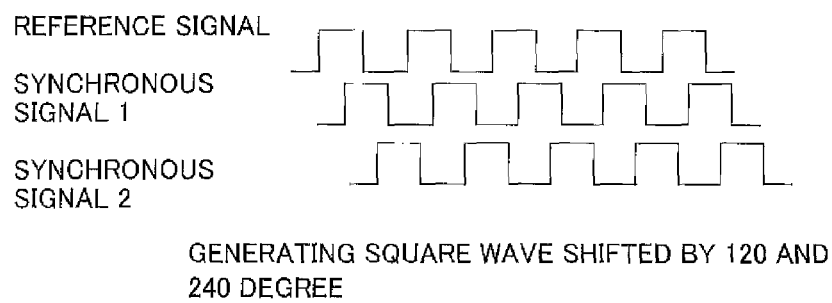
FIGS. 9A-9B are time charts explaining a reference signal and synchronous signals used in the configuration shown in FIG. 8.
Figure 9B:
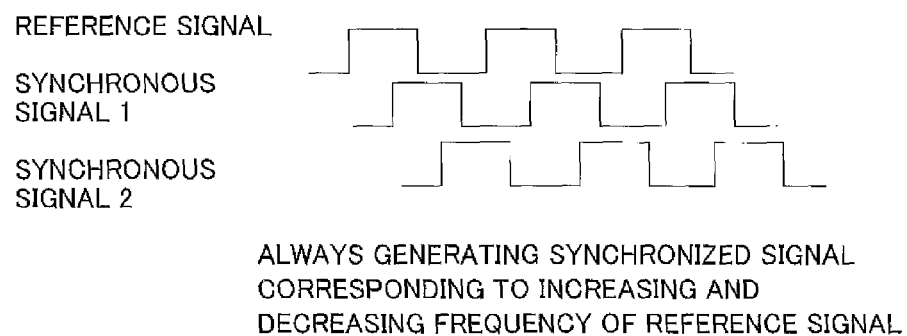

FIG. 8 is a block diagram showing an operation of the CPUs 22a2, 22b2, 22c2, specifically, an operation of an autonomous running control of the generator, and FIGS. 9A-9B are time charts explaining a reference signal and synchronous signals used in the operation of FIG. 8.

As illustrated, the CPU 22a2 of the first (master) inverter 22a has a reference signal generator 22a21 which generates the reference signal (shown in FIGS. 9A-9B) of the predetermined frequency, a PWM controller 22a22 which conducts a PWM control in response to the PWM signals described in FIG. 4, a synchronous signal controller 22a23 which generates synchronous signals 1, 2 (having a predetermined phase difference from the reference signal; shown in FIGS. 9A-9B) that are used to synchronize the output phases of the slave inverters 22b, 22c with the output phase of the master inverter 22a and transmits them to the CPU 22b2, 22c2, and a communication controller 22a24 which controls transmitting and receiving (communication of) the generated synchronous signals through the communication path 22d.

The second and third slave inverters 22b, 22c also have, except for the reference signal generator, PWM controllers 22b22, 22c22, synchronous signal controllers 22b23, 22c23 and communication controllers 22b24, 22c24 which are basically same as those of the master inverter 22a.

The CPU 22a2 of the first (master) inverter 22a, more specifically its synchronous signal controller 22a23 generates the synchronous signals 1, 2 offset by 120 degrees from the reference signal (in other words, the signals that have predetermined phase differences from the reference signal) and transmits them to the CPUs 22b2, 22c2, if the command to output (switch to) the three-phase AC is sent through the selector switch 30e. This will be same when the frequency of the reference signal is a predetermined frequency (FIG. 10A) or lower than the predetermined frequency (FIG. 10B).

Further, the CPU 22a2 of the first (master) inverter 22a communicates with the CPU 22b2, 22c2 and controls the operation of the inverter section 22 to synchronize the V-phase and W-phase outputs from the output terminals 26b, 26c with the output phase of the U-phase output terminal 26a, when the single-phase AC is to be outputted along with the communication with the CPU 28c, such that the single-phase AC is outputted from the single-phase output terminal 26f.

Specifically, the CPU 22a2 generates the reference signal of the predetermined frequency and the synchronous signals that have a predetermined phase difference (i.e., the same phase) from the reference signal, sends them to the CPUs 22b2, 22c2, and controls the operation of the inverter section 22 to synchronize the V-phase and W-phase outputs from the output terminals 26b, 26c with the output phase (reference) of the U-phase output terminal 26a, such that the single-phase AC is outputted from the single-phase output terminal 26f.

Figure 10:
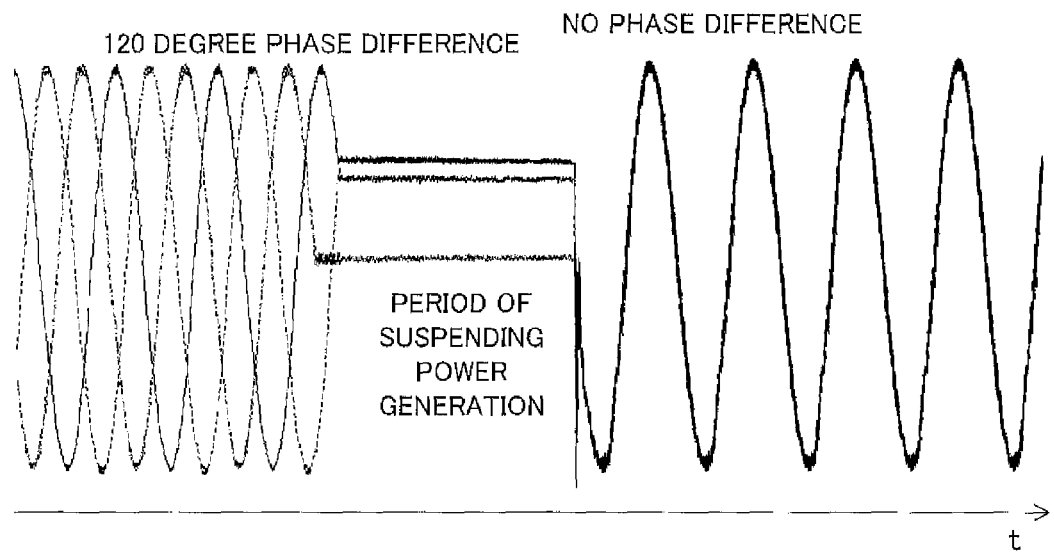
FIG. 10 is a time chart showing waveforms when an output is switched from a three-phase output to a single-phase output in response to the operation shown in FIG. 7.
Figure 11:
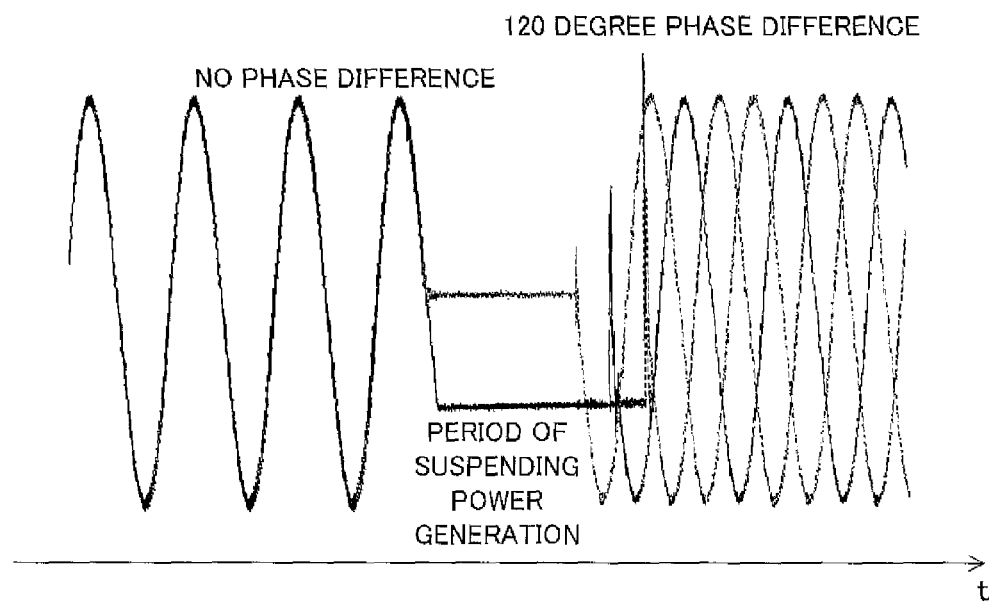
FIG. 11 is a time chart showing waveforms when an output is switched from a single-phase output to a three-phase output in response to the operation shown in FIG. 7.

FIG. 10 is a time chart showing waveforms in a case where the output is switched from the three-phase output to the single-phase output, and FIG. 11 is a time chart showing waveforms in the opposite case. As shown, the three-phase output and single-phase output of the desired voltage are selectively outputted from the generator 10 in response to the manipulation of the selector switch 30e of the control panel section 30 by the user.

Next, the operation of the control apparatus, i.e., an engine speed control of the engine 12 for the inverter generator according to this embodiment will be explained.

Figure 12:
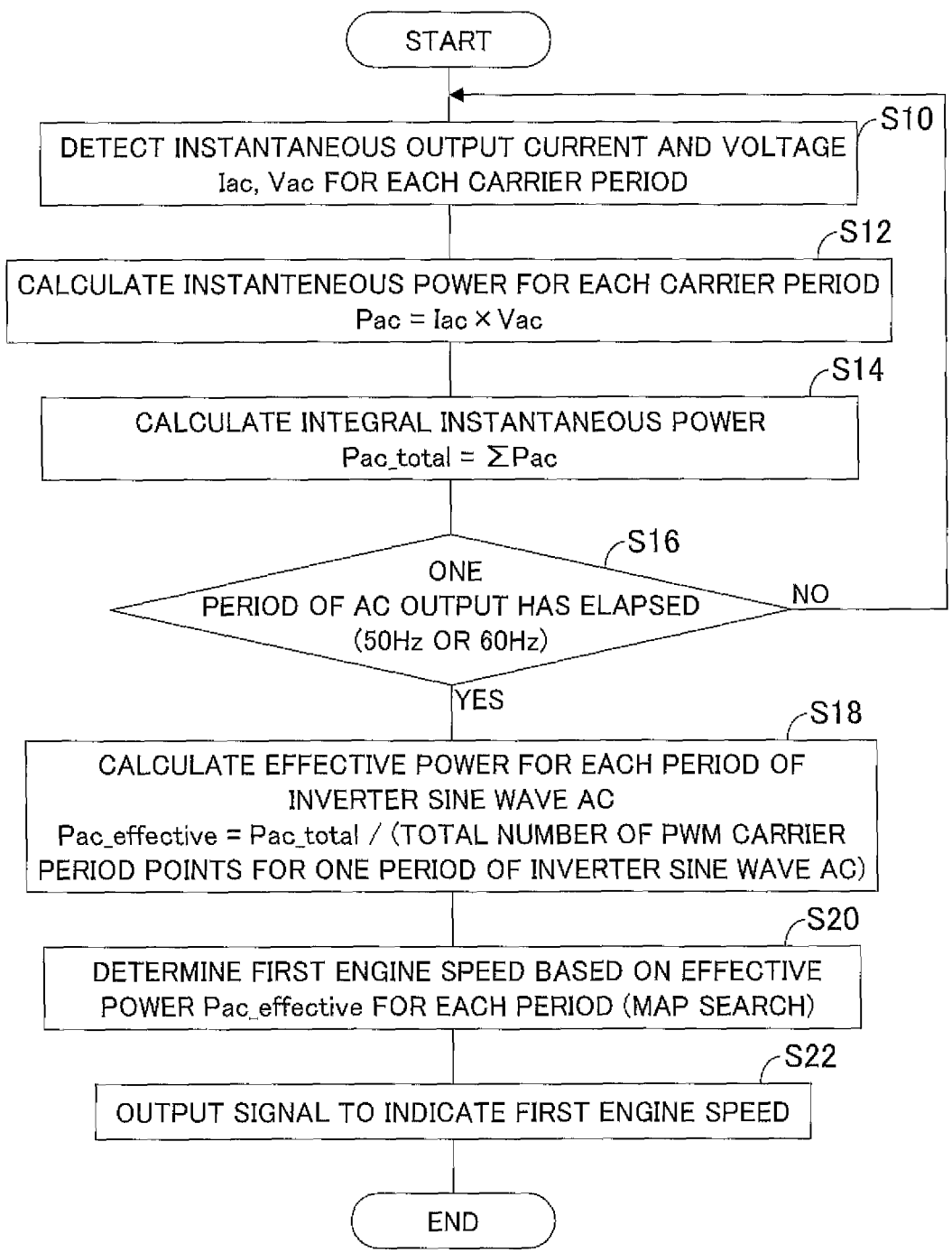
FIG. 12 is a flowchart showing an operation of a CPU of the inverter of the inverter section shown in FIG. 1.

FIG. 12 is a flowchart showing setting processing of the target engine speed of the engine 12, precisely, processing to set a candidate value for the desired engine speed, executed by the CPU 22a2 of the first inverter 22a of the inverter section 22. Although the following explanation will be made for the CPU 22a2 of the first inverter 22a as an example, since the CPUs 22b2, 22c2 of the second and third inverters 22b, 22c execute the similar processing, it can also be applied to the CPUs 22b2, 22c2.

As shown in FIG. 12, the program begins at S (Step; Processing step) 10, in which an instantaneous output current Iac and voltage Vac of the first inverter 22a, i.e., an instantaneous output current Iac and voltage Vac supplied to the electric load 34a are detected (calculated) based on outputs of the current sensor 22a3 and voltage sensor 22a4 for each PWM carrier period. The PWM carrier period is a frequency of a pulse width modulation for the PWM control. For example, if the carrier frequency is 20 kHz, the carrier period is 50 microseconds as its reciprocal number. Accordingly, if the frequency of the output AC voltage from the first inverter 22a is 50 Hz (20 milliseconds period) and the PWM carrier period is 50 microseconds, one period of the output AC voltage is modulated by being divided equally into 400.

The program next proceeds to S12, in which an instantaneous power Pac is calculated by multiplying the detected instantaneous output current Iac by voltage Vac, and to S14, in which an integrated instantaneous power Pac_total is calculated by integrating the calculated instantaneous powers Pac.

Next the program proceeds to S16, in which it is determined whether the one period of the AC output outputted from the first inverter 22a (e.g., when the frequency is 50 Hz the period is 20 milliseconds) has elapsed. When the result in S16 is negative, the program returns to S10, while when the result is affirmative, the program proceeds to S18.

In S18, an effective power (output power) Pac_effective for each period of a sine wave AC in the first inverter 22a is calculated (detected). Specifically as shown, the effective power Pac_effective is calculated by dividing the integrated instantaneous power Pac_total calculated in S14 by total number of PWM carrier period points for one period of the inverter sine wave AC (i.e., since the AC waveform is divided equally into 400 as explained above, the total number in this example is 400).

The program next proceeds to S20, in which the candidate value (first engine speed) for the target engine speed of the engine 12 is determined based on the effective power Pac_effective of the first inverter 22a.

Specifically, based on the effective power Pac_effective of the first inverter 22a, the power (necessary power) to be supplied to the electric load 34 is estimated, and the candidate value for the target engine speed is determined in accordance with the estimated necessary power. To be more specific, if the powers of the electric loads 34b, 34c are considered to be equal to or smaller than that of the electric load 34a, the necessary power can be estimated as at least equal to or smaller than a product of the effective power Pac_effective of the first inverter 22a and the number of the inverters, i.e., 3.

Hence, in S20, the candidate value (first engine speed) for the target engine speed of the engine 12 is determined (set) by retrieving data from mapped values shown in FIG. 13 in accordance with the three times value of the effective power Pac_effective of the first inverter 22a (i.e., the estimated necessary power; product). As clearly shown in FIG. 13, the candidate value for the target engine speed is in proportion to the necessary power, i.e., is set to increase proportionally as the necessary power increases.

Next the program proceeds to S22, in which a signal indicative of the candidate value for the target engine speed determined in S20 is outputted to the CPU 28c of the engine control section 28, and the program is terminated (end).

It is noted that the candidate value for the target engine speed set by the CPU 22a2 in accordance with the effective power Pac_effective of the first inverter 22a is hereinafter called a "first engine speed," and corresponding values related to the second and third inverters 22b, 22c are called a "second engine speed" and "third engine speed."

Figure 14:
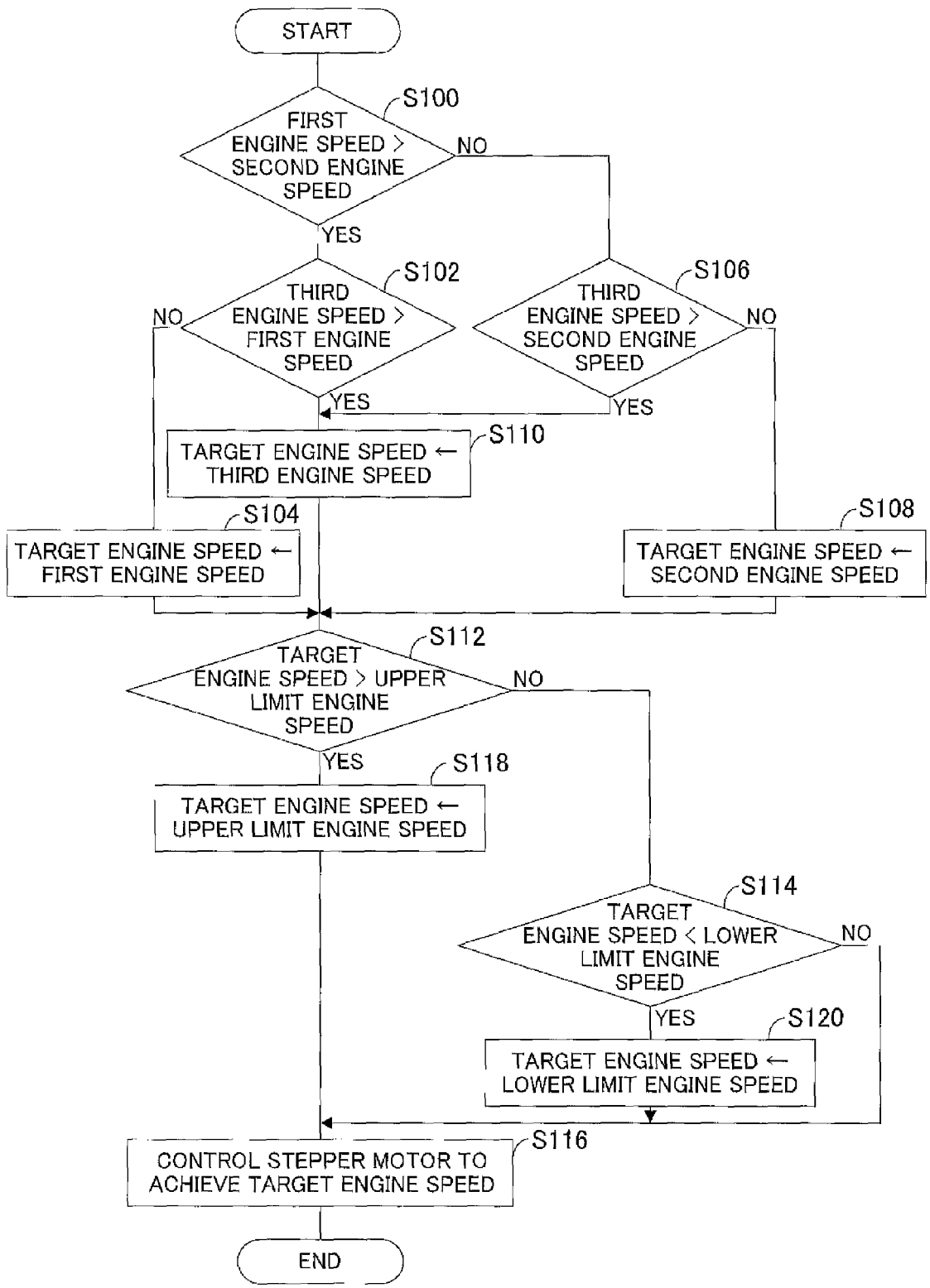
FIG. 14 is a flowchart showing the operation of a CPU of the engine control section shown in FIG. 1.

FIG. 14 is a flowchart showing the operation of the CPU 28c of the engine control section 28. Signals indicative of the abovementioned first, second and third engine speeds are inputted in advance to the CPU 28c from the CPUs 22a2, 22b2, 22c2 of the first, second and third inverters 22a, 22b, 22c.

As shown in FIG. 14, the program begins at S100, in which the first and second engine speeds are compared with each other to determine whether the first engine speed is greater than the second engine speed. When the result in S100 is affirmative, the program proceeds to S102, in which it is determined whether the third engine speed is greater than the first engine speed. When the result in S102 is negative, i.e., when the greatest value among the first, second and third engine speeds is the first engine speed, the program proceeds to S104, in which the first engine speed is determined as a target engine speed.

On the other hand, when the result in S100 is negative, the program proceeds to S106, in which it is determined whether the third engine speed is greater than the second engine speed. When the result in S106 is negative, i.e., when the greatest value among the engine speeds is the second engine speed, the program proceeds to S108, in which the second engine speed is determined as the target engine speed.

When the result in S102 or in S106 is affirmative, i.e., when the greatest value among those three engine speeds is the third engine speed, the program proceeds to S110, in which the third engine speed is determined as the target engine speed.

As explained above, the first, second and third engine speeds set in accordance with the calculated effective powers Pac_effectives of the first, second and third inverters 22a, 22b, 22c are compared to each other, and the greatest value among the first, second and third engine speeds is determined as the target engine speed.

When the target engine speed is determined in S104, S108 or S110, the program next proceeds to S112, in which it is determined whether the determined target engine speed is greater than an upper limit engine speed. The upper limit engine speed represents a maximum engine speed on a performance of the engine 12, e.g., 3800 rpm.

When the result in S112 is negative, the program proceeds to S114, in which it is determined whether the target engine speed is smaller than a lower limit engine speed. The lower limit engine speed is set as a criterion to avoid causing an engine stall, e.g., 2400 rpm.

When the result in S114 is negative, in other words, when the target engine speed determined in S104, S108 or S110 is within a predetermined range between the upper limit engine speed and the lower limit engine speed, the program proceeds to S116, in which the operation of the throttle motor 12d is controlled to achieve the determined target engine speed. More specifically, the operation of the throttle motor 12d is feedback-controlled to modify the opening of the throttle valve 12d so that the engine speed detected at the engine speed detection circuit 28e is converged at the target engine speed.

When the result in S112 is affirmative, the program proceeds to S118, in which the determined target engine speed is adjusted to the upper limit engine speed, and to S116, in which the operation of the throttle motor 12d is controlled so that the engine speed is converged at the adjusted target engine speed, i.e., the upper limit engine speed.

When the result in S114 is affirmative, the program proceeds to S120, in which the determined target engine speed is adjusted to the lower limit engine speed, and to S116, in which the operation of the throttle motor 12d is controlled so that the engine speed is converged at the adjusted target engine speed, i.e., lower limit engine speed.

As described above, the first embodiment is configured so that a control apparatus 10 for an inverter generator A (10A) having a first, second and third windings (18a, 18b, 18c) wound around an alternator (alternator section 16) driven by an engine (12), and first, second and third inverters (22a, 22b, 22c) each connected to the first, second and third windings respectively and adapted to convert alternating current outputted from the first, second and third windings into direct current by driving switching elements for direct current conversion and to invert the converted direct current into single-phase alternating current in a desired frequency by driving the switching elements for alternating current conversion so as to supply the inverted alternating current to an electric load (32), comprising: an actuator (throttle motor 12d) adapted to open and close a throttle valve (12b) of the engine, a power detector (current sensors 22a3, 22b3, 22c3, voltage sensors 22a4, 22b4, 22c4, CPUs 22a2, 22b2, 22c2. S10 to S18) adapted to detect output powers of the first, second and third inverters, and an actuator controller (CPU 28c. S100 to S110, S116) adapted to determine a target engine speed of the engine based on the detected output powers of the first, second and third inverters and to control an operation of the actuator such that the speed of the engine converges at the determined target engine speed. In other words, since it is configured to determine the target engine speed of the engine 12 based on the effective powers Pac_effectives of the first, second and third inverters 22a, 22b, 22c, it becomes possible to avoid the influence from engine speed fluctuation.

With this, even if the electric load 34 is increased and decreased so that the engine speed fluctuates, parameters (i.e., the effective powers Pac_effectives of the first, second and third inverters 22a, 22b, 22c) to be used to determine the target engine speed are not influenced by the fluctuation. As a result, since the necessary power (electric load 34) is reflected accurately, it becomes possible to prevent control hunting from happening and the engine speed can be controlled reliably.

Further, since the first embodiment is configured to determine the target engine speed by the CPU 28c of the engine control section (28), it becomes possible to utilize the control apparatus for any combination of, such as having a different configuration of the inverter section (22) (e.g., a single-phase type or dual-voltage type), or using a carburetor system or FI (fuel injection) system to inject fuel. Hence, applicability and versatility can be improved compared to an apparatus to determine the target engine speed by, for example, the CPU 22a2 of the inverter section (22).

Further, the embodiment is configured so that the actuator controller compares first, second and third engine speeds with each other which are set in accordance with the detected output powers of the first, second and third inverters (22a, 22b, 22c), and determines the target engine speed at a greatest engine speed among the first, second and third engine speeds. With this, it becomes possible to determine the target engine speed in accordance with the electric load 23 and to control the engine speed reliably.

Further, since the first embodiment is configured so that the actuator controller adjusts the determined target engine speed to an upper limit engine speed when the determined target engine speed is greater than the upper limit engine speed, it becomes possible to avoid from determining the excessively greater target engine speed and to prevent the engine speed from increasing excessively.

Further, since the first embodiment is configured so that the actuator controller adjusts the determined target engine speed to a lower limit engine speed when the determined target engine speed is smaller than the lower limit engine speed, it becomes possible to avoid from determining the excessively smaller target engine speed and to prevent the engine speed from decreasing excessively.

Further, since the first embodiment is configured so that each of the first, second and third inverters (22a, 22b, 22c) comprises a single-phase two wire inverter, and neutral lines of output terminals of the first, second third inverters are combined and connected to the electric load (34), it becomes possible to utilize the generator 10 as a three-phase four-wire inverter generator with a simple structure.

Further, the generator 10 is configured to comprise so that the inverter generator A further comprises first, second and third controllers (CPUs 22a2, 22b2, 22c2) adapted to control turning ON/OFF of the switching elements for the direct and alternating conversion and connected to communicate with each other, the first controller (CPU 22a2) operating the first inverter (22a) as a master inverter and the second and third controller (CPUs 22b2, 22c2) operating the second and third inverters (22b, 22c) as slave inverters, a three-phase output terminal (26e) connected to terminal groups (26a, 26b, 26c) which are connected to the first, second and third inverters to output the inverted alternating current as one of U-phase, V-phase, and W-phase outputs and connected to a neutral terminal of the terminal groups in series, a single-phase output terminal (26f) connected to the terminal groups in parallel and connected to the neutral terminal in series, a switching mechanism (26g) adapted to switch the three-phase output terminal and single-phase output terminal, and three-phase/single-phase selector switch (30e) adapted to be manipulated by a user; wherein the first, second and third controllers control turning ON/OFF of the switching elements so that the outputs from the first, second and third inverters become three-phase alternating current or single-phase alternating current making the output from the first inverter as a reference in response to the output of the selector switch sent through the engine controller.

With this, it becomes possible to selectively and reliably output a three-phase and single-phase AC at a desired voltage in response to the output of the selector switch 30e adapted to be manipulated by the user, thereby enabling to utilize the output from the generator sufficiently.

Next, a control apparatus for an inverter generator according to a second embodiment of this invention will now be explained.

Figure 15:
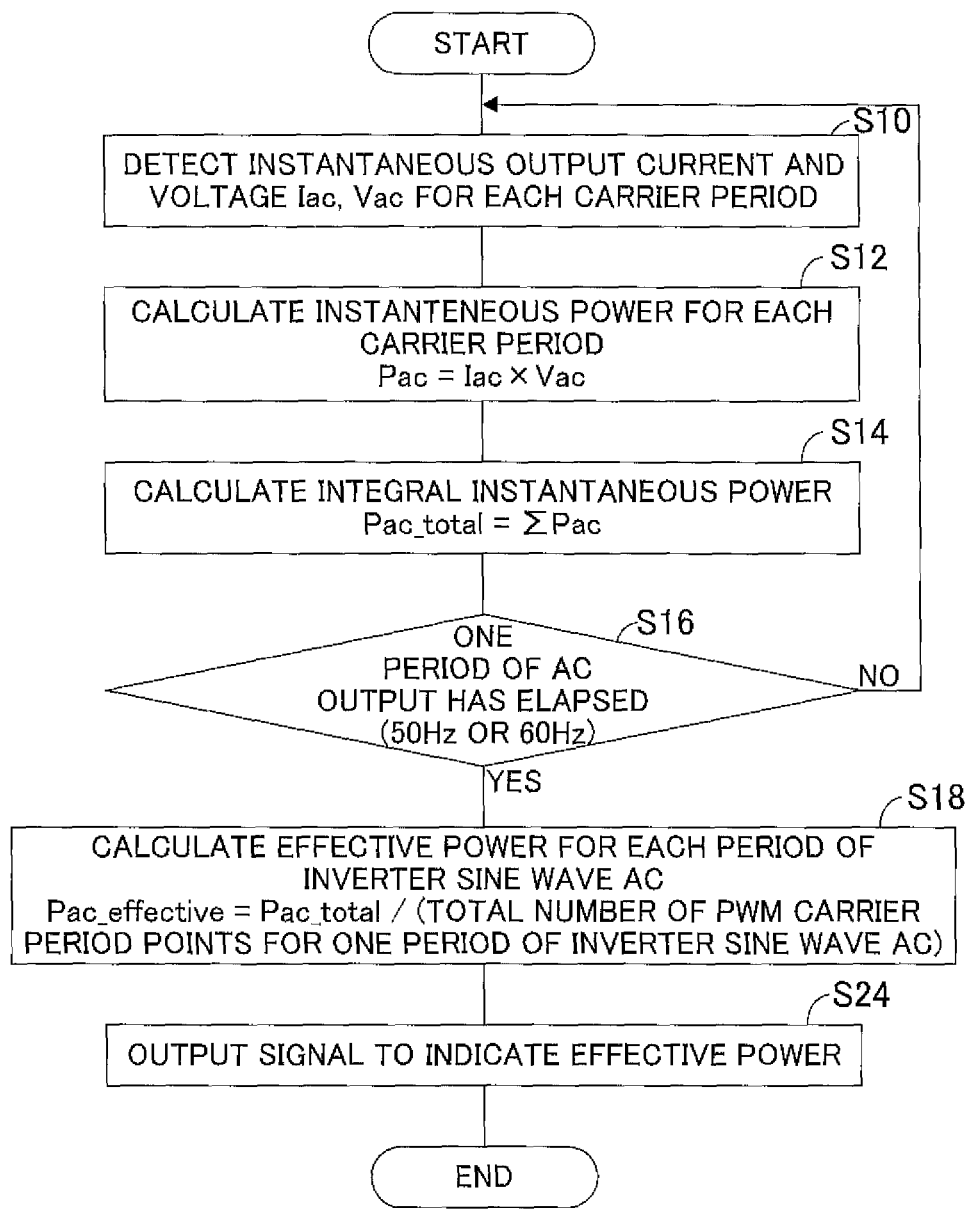
FIG. 15 is a flowchart similar to FIG. 12, but showing an operation of a CPU of an inverter of an inverter section in a control apparatus for an inverter generator according to a second embodiment of the invention.

FIG. 15 is a flowchart similar to FIG. 12, but showing an operation of a CPU 22a2 of a first inverter 22a of an inverter section 22 in the control apparatus for the inverter generator 10 according to the second embodiment of the invention.

It should be noted that in the following flowchart, constituent processing corresponding to those of the first embodiment are assigned by the same step numbers. Although the following explanation will be made for a CPU 22a2 of a first inverter 22a as an example, it can also be applied to the CPUs 22b2, 22c2.

As shown in FIG. 15, after the processing of S10 to S18, the program proceeds to S24, in which a signal indicative of an effective power Pac_effective of the first inverter 22a calculated in S18 is outputted to the CPU 28c of the engine control section 28, and the program is terminated (end).

It is noted that the effective power Pac_effective of the first inverter 22a calculated by the CPU 22a2 is hereinafter called a "first effective power," and corresponding values related to the second and third inverters 22b, 22c are called a "second effective power" and "third effective power."

Figure 16:
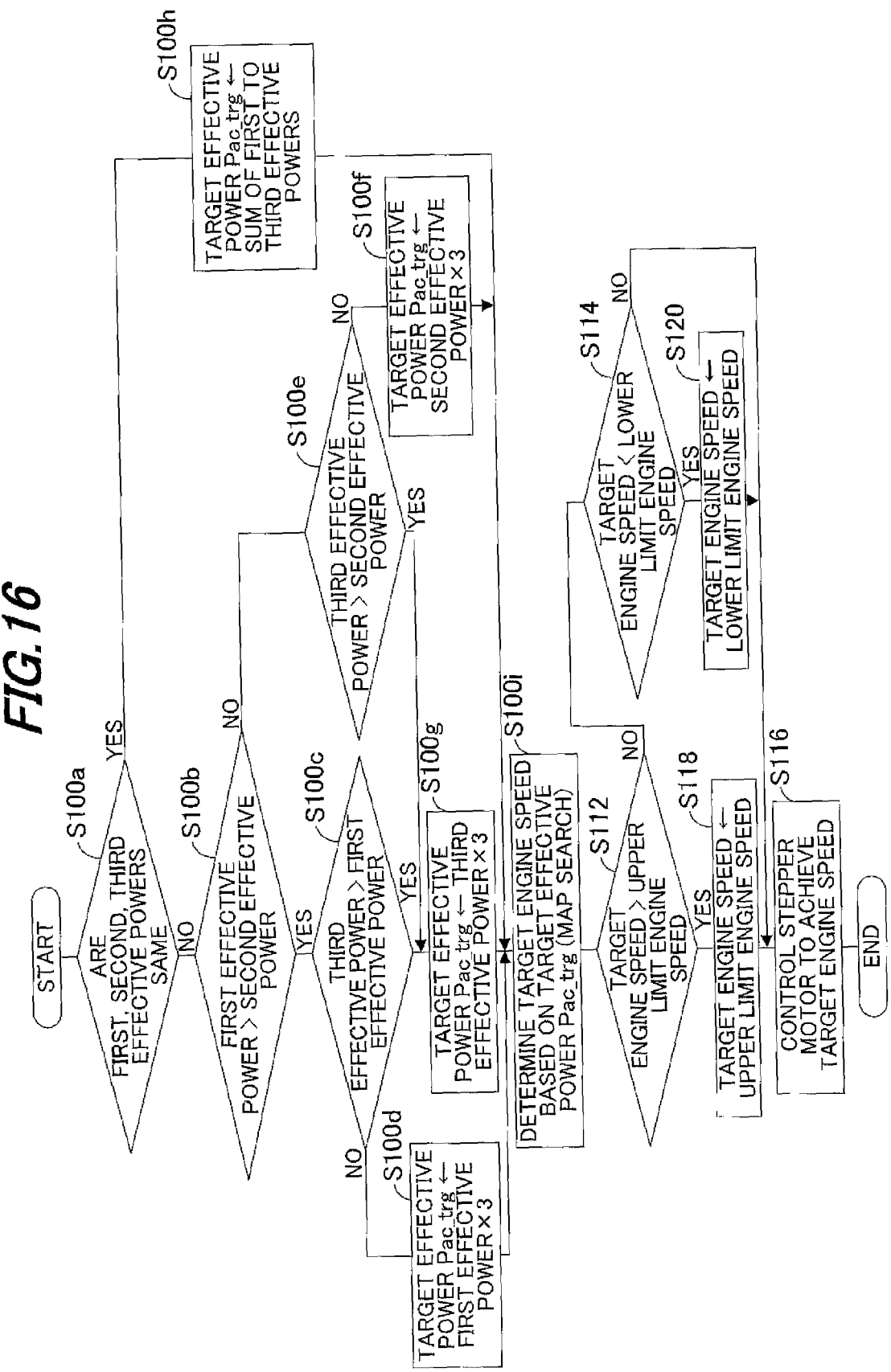
FIG. 16 is a flowchart similar to FIG. 14, but showing another operation of the CPU of the engine control section shown in FIG. 1.

FIG. 16 is a flowchart similar to FIG. 14, but showing an operation of the CPU 28c of the engine control section 28 according to the second embodiment. Signals indicative of the abovementioned first, second and third effective powers was inputted in advance to the CPU 28c from the CPUs 22a2, 22b2, 22c2 of the first, second and third inverters 22a, 22b, 22c.

As shown in FIG. 16, the program begins at S100a, in which it is determined whether the first, second and third effective powers are the same (identical). The term "same" used here includes a substantially the same, i.e., in S100a, if the first, second and third effective powers are within a prescribed range, it is determined as the "same."

When the result in S100a is negative, the program proceeds to S100b, in which the first and second effective powers are compared to determine whether the first effective power is greater than the second effective power. When the result in S100b is affirmative, the program proceeds to S100c, in which it is determined whether the third effective power is greater than the first effective power. When the result in S100c is negative, i.e., when the greatest value among the first, second and third effective powers is the first effective power, the program proceeds to S100d, in which the target effective power (necessary power) Pac_trg is determined based on the first effective power.

Specifically, when the greatest value is the first effective power, the power (necessary power) to be supplied to the electric load 34 can be estimated at least equal to or smaller than a product of the first effective power and the number of the inverters, i.e., 3. Hence, in S100d, the target effective power Pac_trg is determined as three times value of the first effective power.

On the other hand, when the result in S100b is negative, the program proceeds to S100e, in which it is determined whether the third effective power is greater than the second effective power. When the result in S100e is negative, i.e., when the greatest value among the effective powers is the second effective power, the program proceeds to S100f, in which the target effective power Pac_trg is determined as the three times value of the second effective power.

When the result in S100c or S100e is affirmative, i.e., when the greatest value among those three effective powers is the third effective power, the program proceeds to S100g, in which the target effective power Pac_trg is determined as three times value of the third effective power.

When the result in S100a is affirmative, i.e., when the powers of the connected electric loads 34a, 34b, 34c are the same (identical), or the single-phase AC is outputted in response to the manipulation of the selector switch 30e so that the output powers from the first, second and third inverters 22a, 22b, 22c are the same (identical), the program proceeds to S100h, in which the target effective power Pac_trg is determined as a sum of the output powers form the first, second and third inverters 22a, 22b, 22c (specifically, the first, second and third effective powers).

When the target effective power Pac_trg is determined in S100d, S100f, S100g or S100h, the program then proceeds to S100i, in which the target engine speed is determined based on the determined target effective power Pac_trg. To be more specific, based on the target effective power Pac_trg, the target engine speed is determined by retrieving data from the mapped value shown in the abovementioned FIG. 13.

Once the target engine speed is determined in S100i, the program proceeds to S112 and further steps to execute the aforementioned processing, and to S116, in which the operation of the throttle motor 12d is controlled to achieve the target engine speed.

As described above, the second embodiment is configured so that the actuator controller compares the detected output powers (first, second and third effective powers Pac_effective) of the first, second and third inverters (22a, 22b, 22c) with each other, and determines the target engine speed based on a greatest value among the first, second and third output powers (S100b to S100g, S100i). With this, it becomes possible to determine the target engine speed corresponding to the electric load 34 appropriately and to control the engine 12 to the speed.

Further, it is configured so that when the detected output powers (effective powers Pac_effective. first, second and third effective powers) of the first, second and third inverters 22a, 22b, 22c are the same (identical), the actuator controller determines the target engine speed based on a sum of the detected output powers of the first, second and third inverters (S100a, S100h, S100i). With this, it becomes possible to appropriately determine the target engine speed corresponding to the electric load 34 with a simple structure and to control the engine 12 to the speed reliably.

In other aspects, the configurations and effects are the same as those of the apparatus according to the first embodiment so the explanation thereof will be omitted.

As stated above, in the first and second embodiments of the invention, it is configured so that a control apparatus 10 for an inverter generator A having a first, second and third windings (18a, 18b, 18c) wound around an alternator (alternator section 16) driven by an engine (12), and first, second and third inverters (22a, 22b, 22c) each connected to the first, second and third windings respectively and adapted to convert alternating current outputted from the first, second and third windings into direct current by driving switching elements for direct current conversion and to invert the converted direct current into single-phase alternating current in a desired frequency by driving the switching elements for alternating current conversion so as to supply the inverted alternating current to an electric load (32), comprising: an actuator (throttle motor 12d) adapted to open and close a throttle valve (12b) of the engine, a power detector (current sensors 22a3, 22b3, 22c3, voltage sensors 22a4, 22b4, 22c4, CPUs 22a2, 22b2, 22c2. S10 to S18) adapted to detect output powers (effective powers) Pac_effective of the first, second and third inverters, and an actuator controller (CPU 28c. S100 to S110, S116) adapted to determine a target engine speed of the engine based on the detected output powers of the first, second and third inverters and to control an operation of the actuator such that the speed of the engine converges at the determined target engine speed.

Further, in the first embodiment, it is configured so that the actuator controller compares first, second and third engine speeds with each other which are set in accordance with the detected output powers (effective powers) Pac_effective of the first, second and third inverters, and determines the target engine speed at a greatest engine speed among the first, second and third engine speeds (S100 to S110).

Further, in the second embodiment, it is configured so that the actuator controller compares the detected output powers (effective powers) Pac_effective of the first, second and third inverters with each other, and determines the target engine speed based on a greatest value among the first, second and third output powers (S100b, S100g, S100i).

Further, in the embodiment, it is configured so that the actuator controller determines the target engine speed based on a sum of the detected output powers (effective powers) Pac_effective of the first, second and third inverters when the detected output powers are identical.

Further, in the first and second embodiments, it is configured so that the actuator controller adjusts the determined target engine speed to an upper limit engine speed when the determined target engine speed is greater than the upper limit engine speed (S112, 118).

Further, in the embodiments, it is configured so that the actuator controller adjusts the determined target engine speed to a lower limit engine speed when the determined target engine speed is smaller than the lower limit engine speed (S114, S120)

Further, in the embodiments, it is configured so that each of the first, second and third inverters comprises a single-phase two wire inverter, and neutral lines of output terminals of the first, second third inverters are combined and connected to the electric load.

Further, in the embodiments, it is configured so that the inverter generator comprising first, second and third controllers (CPUs 22a2, 22b2, 22c2) adapted to control turning ON/OFF of the switching elements for the direct and alternating conversion and connected to communicate with each other, the first controller operating the first inverter (22a) as a master inverter and the second and third controller operating the second and third inverters (22b, 22c) as slave inverters, a three-phase output terminal (26e) connected to terminal groups (26a, 26b, 26c) which are connected to the first, second and third inverters to output the inverted alternating current as one of U-phase, V-phase, and W-phase outputs and connected to a neutral terminal of the terminal groups in series, a single-phase output terminal (26f) connected to the terminal groups in parallel and connected to the neutral terminal in series, a switching mechanism (26g) adapted to switch the three-phase output terminal and single-phase output terminal, and three-phase/single-phase selector switch (30e) adapted to be manipulated by a user; wherein the first, second and third controllers control turning ON/OFF of the switching elements so that the outputs from the first, second and third inverters become three-phase alternating current or single-phase alternating current making the output from the first inverter as a reference in response to the output of the selector switch sent through the engine controller.

It should be noted that, although the FETs are used as the switching elements of the inverter section 22, the embodiments can use any other switching elements such as IGBTs (Insulated Gate Bipolar Transistors), etc.

It should also be noted that, although it is configured to determine the target engine speed and to control the driving operation of the stepper motor 12*d* by the CPU 28*c* of the engine control section 28, it can be configured to execute them by one of the CPUs 22*a*2, 22*b*2, 22*c*2 of the inverter section 22.

Japanese Patent Application No. 2011-110576 filed on May 17, 2011, is incorporated by reference herein in its entirety.

While the invention has thus been shown and described with reference to a specific embodiment, it should be noted that the invention is in no way limited to the details of the described arrangements; changes and modifications may be made without departing from the scope of the appended claims.

What is claimed is:

1. A control apparatus for an inverter generator having first, second and third windings wound around an alternator driven by an engine, and first, second and third inverters each connected to the first, second and third windings respectively and adapted to convert alternating current outputted from the first, second and third windings into direct current by driving switching elements for direct current conversion and to invert the converted direct current into single-phase alternating current in a desired frequency by driving the switching elements for alternating current conversion so as to supply the inverted alternating current to an electric load, comprising:

an actuator adapted to open and close a throttle valve of the engine;

a power detector adapted to detect output powers of the first, second and third inverters; and an actuator controller adapted to determine a target engine speed of the engine based on the detected output powers of the first, second and third inverters and to control an operation of the actuator such that a speed of the engine converges at the determined target engine speed.

2. The apparatus according to claim 1, wherein the actuator controller compares first, second and third engine speeds with each other which are set in accordance with the detected output powers of the first, second and third inverters, and determines the target engine speed at a greatest engine speed among the first, second and third engine speeds.

3. The apparatus according to claim 1, wherein the actuator controller compares the detected output powers of the first, second and third inverters with each other, and determines the target engine speed based on a greatest value among the first, second and third output powers.

4. The apparatus according to claim 1, wherein the actuator controller determines the target engine speed based on a sum of the detected output powers of the first, second and third inverters when the detected output powers are identical.

5. The apparatus according to claim 1, wherein the actuator controller adjusts the determined target engine speed to an upper limit engine speed when the determined target engine speed is greater than the upper limit engine speed.

6. The apparatus according to claim 1, wherein the actuator controller adjusts the determined target engine speed to a lower limit engine speed when the determined target engine speed is smaller than the lower limit engine speed.

7. The apparatus according to claim 1, wherein each of the first, second and third inverters comprises a single-phase two wire inverter, and neutral lines of output terminals of the first, second and third inverters are combined and connected to the electric load.

8. The apparatus according to claim 1, wherein the inverter generator comprises:

first, second and third controllers adapted to control turning ON/OFF of the switching elements for the direct and alternating conversion and connected to communicate with each other, the first controller operating the first inverter as a master inverter and the second and third controller operating the second and third inverters as slave inverters;

a three-phase output terminal connected to terminal groups which are connected to the first, second and third inverters to output the inverted alternating current as one of U-phase, V-phase, and W-phase outputs and connected to a neutral terminal of the terminal groups in series;

a single-phase output terminal connected to the terminal groups in parallel and connected to the neutral terminal in series;

a switching mechanism adapted to switch the three-phase output terminal and single-phase output terminal;

three-phase/single-phase selector switch adapted to be manipulated by a user; and an engine controller adapted to control an operation of the engine and to send an output of the selector switch to the first, second and third controllers to operate the switching mechanism in response to the output of the selector switch, wherein the first, second and third controllers control turning ON/OFF of the switching elements so that the outputs from the first, second and third inverters become three-phase alternating current or single-phase alternating current making the output from the first inverter as a reference in response to the output of the selector switch sent through the engine controller.

9. A method for controlling an apparatus for an inverter generator having a first, second and third windings wound around an alternator driven by an engine, first, second and third inverters each connected to the first, second and third windings respectively and adapted to convert alternating current outputted from the first, second and third windings into direct current by driving switching elements for direct current conversion and to invert the converted direct current into single-phase alternating current in a desired frequency by driving the switching elements for alternating current conversion so as to supply the inverted alternating current to an electric load, and an actuator adapted to open and close a throttle valve of the engine, comprising the steps of:

detecting output powers of the first, second and third inverters;

determining a target engine speed of the engine based on the detected output powers of the first, second and third inverters; and controlling an operation of the actuator such that the speed of the engine converges at the determined target engine speed.

10. The method according to claim 9, further including the step of:

comparing first, second and third engine speeds with each other which are set in accordance with the detected output powers of the first, second and third inverters, wherein the step of determining determines the target engine speed at a greatest engine speed among the first, second and third engine speeds.

11. The method according to claim 9, further including the step of:

comparing the detected output powers of the first, second and third inverters with each other, wherein the step of determining determines the target engine speed based on a greatest value among the output powers.

12. The method according to claim 9, wherein the step of determining determines the target engine speed based on a sum of the detected output powers of the first, second and third inverters when the detected output powers are identical.

13. The method according to claim 9, further including the step of:
   adjusting the determined target engine speed to an upper limit engine speed when the determined engine speed is greater than the upper limit engine speed.

14. The method according to claim 9, further including the step of:
   adjusting the determined target engine speed to a lower limit engine speed when the determined engine speed is smaller than the lower limit engine speed.

* * * * *